US008776988B2

(12) United States Patent
van der Vliet et al.

(10) Patent No.: US 8,776,988 B2
(45) Date of Patent: Jul. 15, 2014

(54) TRANSFER APPARATUS FOR TRANSFERRING AN ITEM

(75) Inventors: Albert van der Vliet, Koedijk (NL);
Jeroen Aart Jan Slobbe, Epe (NL);
Oscar Slurink, Kampen (NL)

(73) Assignee: Sluis Cigar Machinery B.V., Kampen (NL)

( * ) Notice: Subject to any disclaimer, the term of this patent is extended or adjusted under 35 U.S.C. 154(b) by 179 days.

(21) Appl. No.: 13/498,420

(22) PCT Filed: Sep. 29, 2010

(86) PCT No.: PCT/NL2010/050637
§ 371 (c)(1),
(2), (4) Date: May 23, 2012

(87) PCT Pub. No.: WO2011/040810
PCT Pub. Date: Apr. 7, 2011

(65) Prior Publication Data
US 2012/0228087 A1    Sep. 13, 2012

(30) Foreign Application Priority Data

Sep. 29, 2009 (NL) .................................. 2003570
Feb. 22, 2010 (NL) .................................. 2004278

(51) Int. Cl.
*B65G 29/00* (2006.01)
(52) U.S. Cl.
USPC ................ 198/470.1; 198/867.05; 198/803.3
(58) Field of Classification Search
USPC ........ 198/470.1, 471.1, 471.2, 475.1, 867.02, 198/867.05, 867.07, 803.3, 803.4, 803.5
See application file for complete search history.

(56) References Cited

U.S. PATENT DOCUMENTS

| 3,330,400 A | 7/1967 | Alexander |
| 3,567,043 A | 3/1971 | Sirvet et al. |
| 3,580,451 A * | 5/1971 | Fraitzl .................. 198/803.3 |

(Continued)

FOREIGN PATENT DOCUMENTS

| CN | 1902108 A | 1/2007 |
| DE | 2109709 A1 | 9/1972 |

(Continued)

OTHER PUBLICATIONS

Search Report and Written Opinion for NL 2004278.

(Continued)

*Primary Examiner* — James R Bidwell
(74) *Attorney, Agent, or Firm* — Hoffmann & Baron, LLP

(57) ABSTRACT

A transfer apparatus for transferring an item includes a rail (3) forming an endless track (4) along which the item (100) is transferred, a transporter (41, 42) which is movable along the rail and includes at least one gripper (10) for gripping the item, a driver (7) for moving the transporter along the rail, wherein the transporter includes at least two carriers (8) engaging the rail and located at a distance from each other, neighboring carriers are coupled to each other by a coupler (9), at least one coupler is carrying at least one gripper, the rail includes a first face (12) and a second face (13), each carrier includes a first engage member (14) and a second engage (15) member (15) engaging the first face (12) and a third engage member (16) engaging the second face (13), the engage members of each carrier are positioned relative to each other such that the engage members form a triangle.

13 Claims, 17 Drawing Sheets

(56) References Cited

U.S. PATENT DOCUMENTS

| | | | | |
|---|---|---|---|---|
| 3,944,058 | A | * | 3/1976 | Strauss .................... 198/377.07 |
| 3,985,223 | A | | 10/1976 | Forcella et al. |
| 4,638,906 | A | | 1/1987 | Winiasz |
| 5,503,264 | A | * | 4/1996 | Eberle ...................... 198/867.05 |
| 7,404,549 | B2 | * | 7/2008 | Meier et al. ................ 198/470.1 |
| 7,810,629 | B2 | * | 10/2010 | Kronseder et al. ......... 198/347.1 |
| 8,534,455 | B2 | * | 9/2013 | Oppliger et al. ............. 198/852 |
| 2005/0103605 | A1 | | 5/2005 | Hartness et al. |
| 2005/0103606 | A1 | | 5/2005 | Hartness et al. |
| 2005/0269188 | A1 | | 12/2005 | Hartness et al. |
| 2010/0282574 | A1 | * | 11/2010 | Ueda .......................... 198/803.3 |

FOREIGN PATENT DOCUMENTS

| | | |
|---|---|---|
| DE | 102007048861 A1 | 4/2009 |
| EP | 0468589 A1 | 1/1992 |
| EP | 1486439 A2 | 12/2004 |
| GB | 1 263 669 | 2/1972 |
| WO | 2005/049452 A2 | 6/2005 |

OTHER PUBLICATIONS

English (machine) translation of DE 2109709.
English (machine) translation of DE 102007048861.
English Translation of CN 1902108A.

* cited by examiner

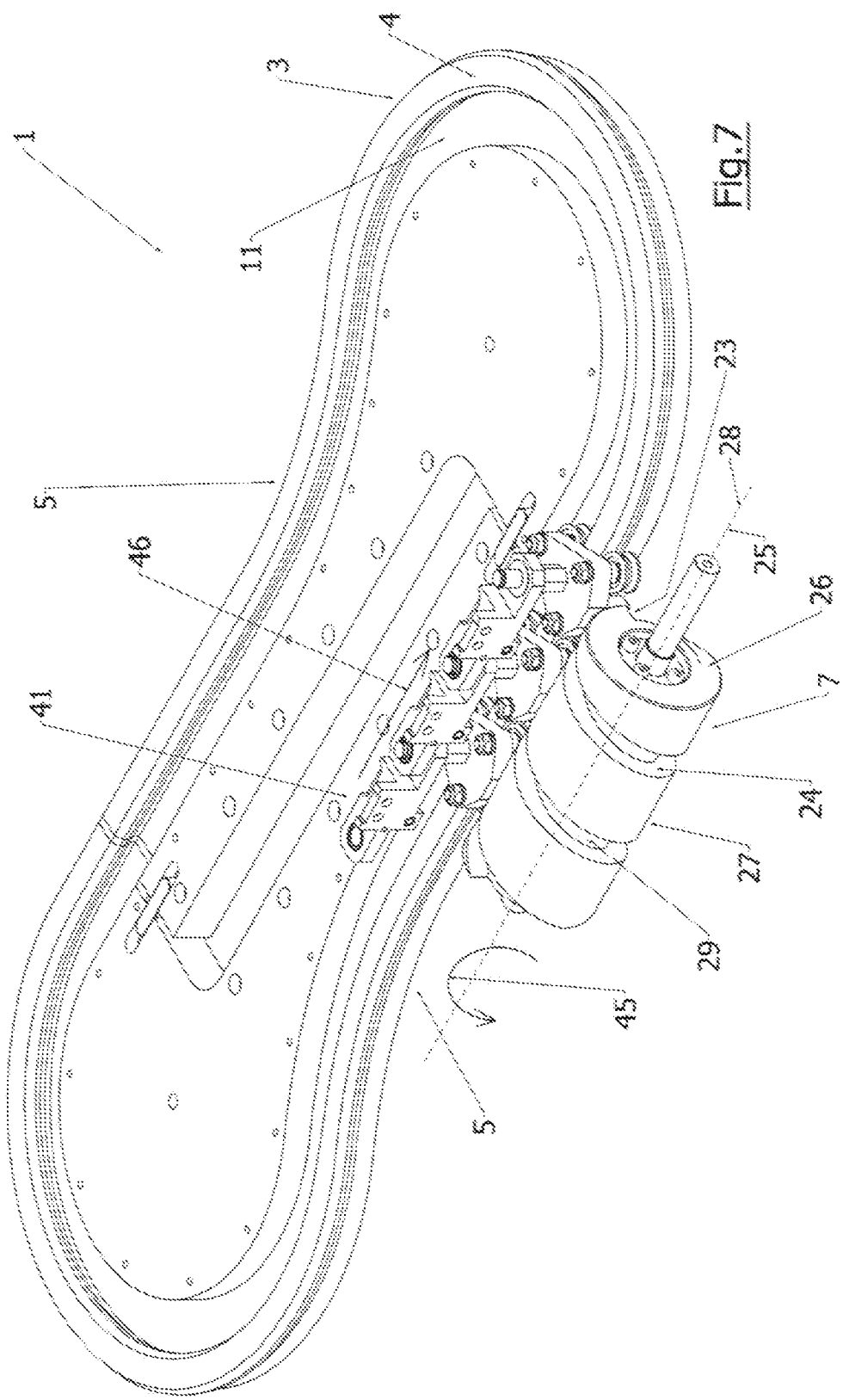

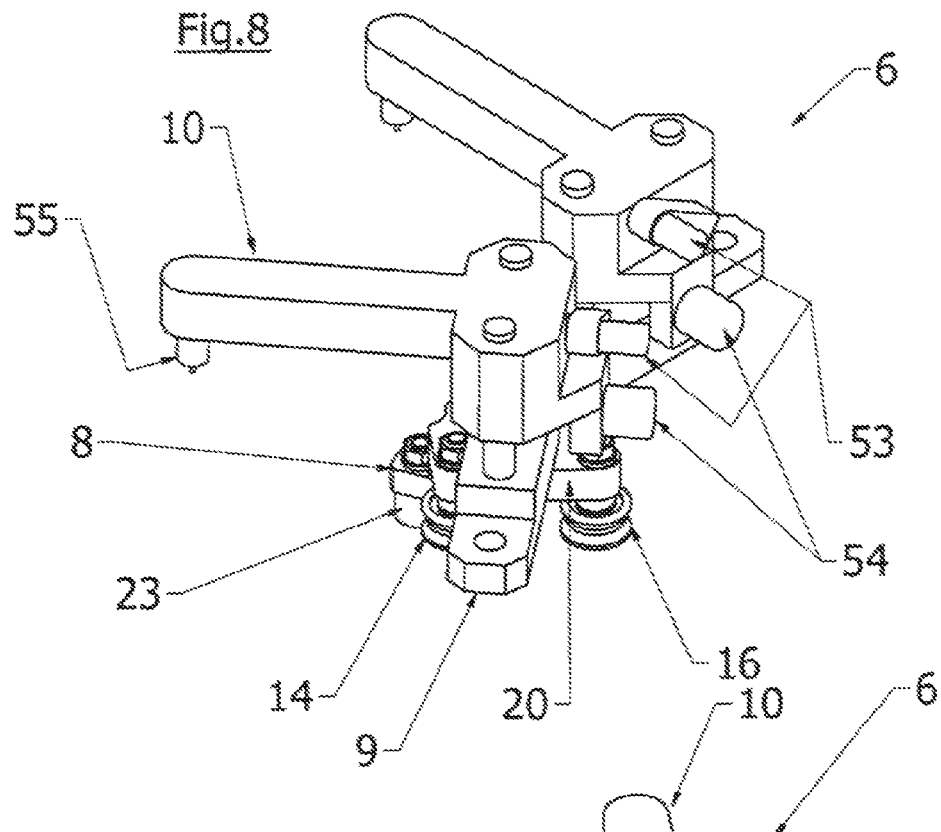
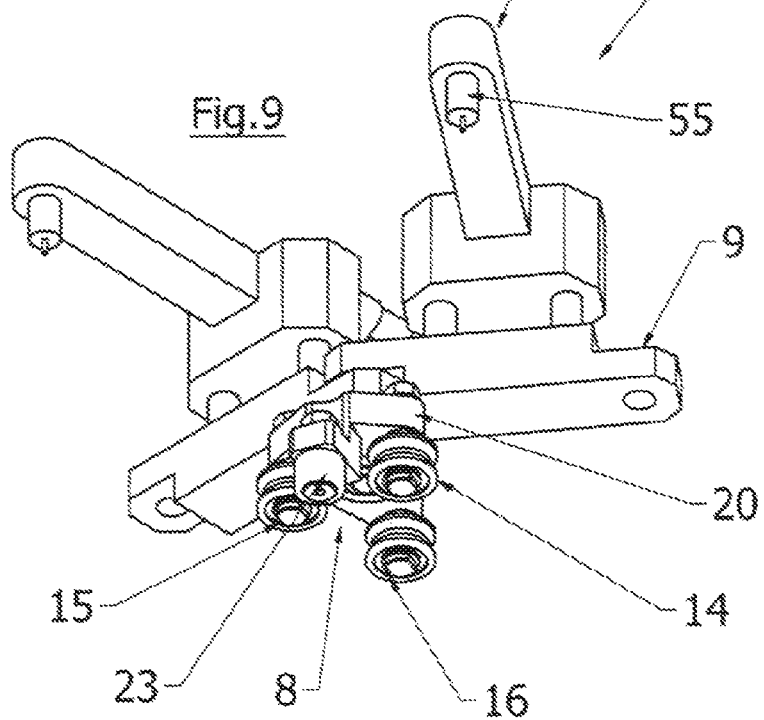

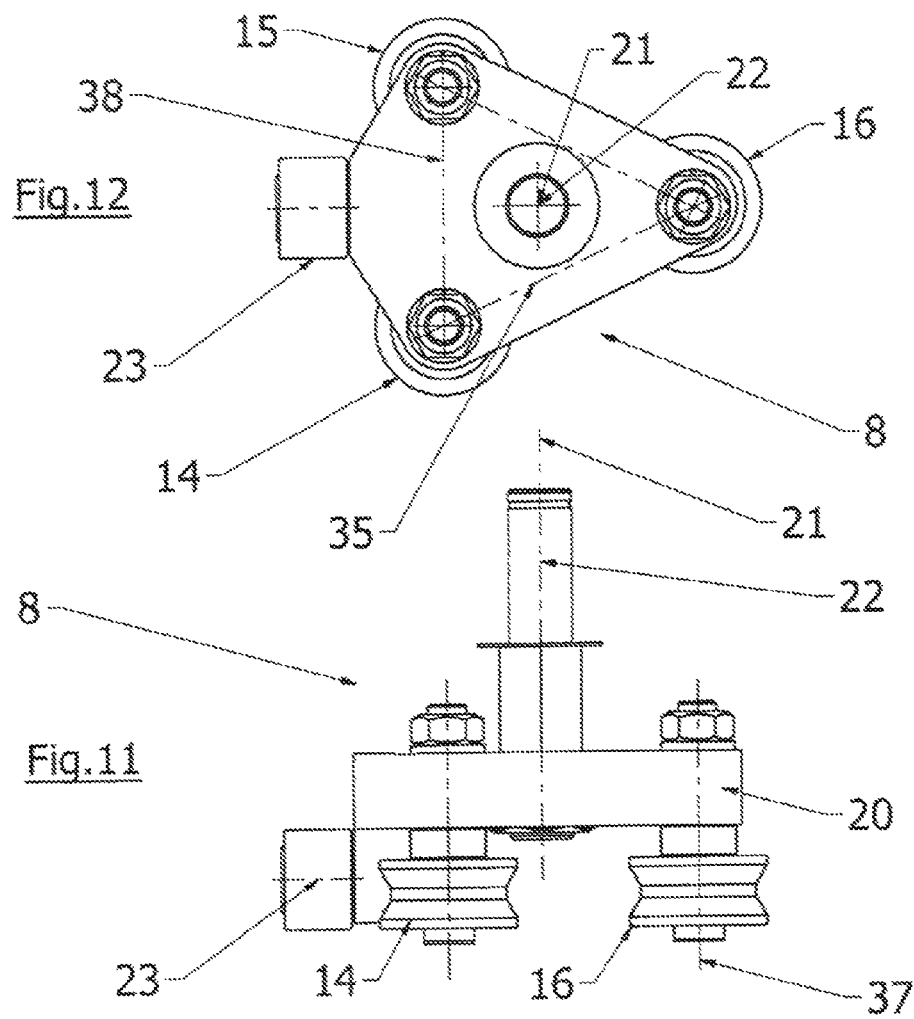
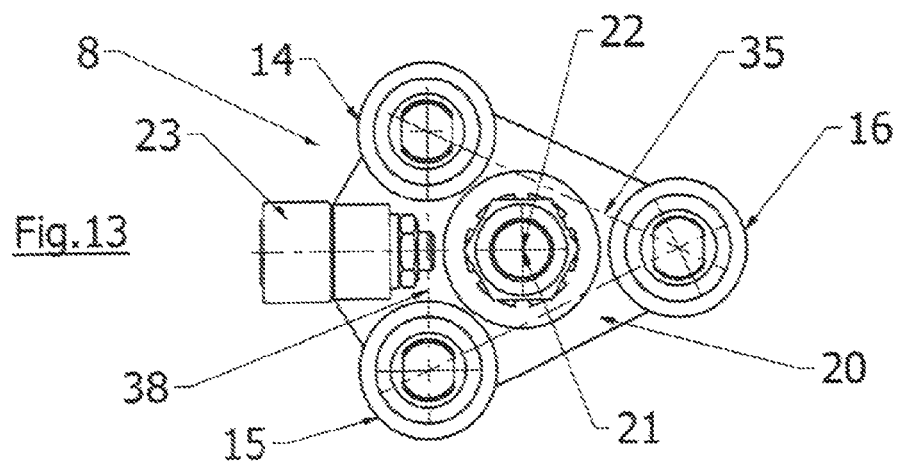

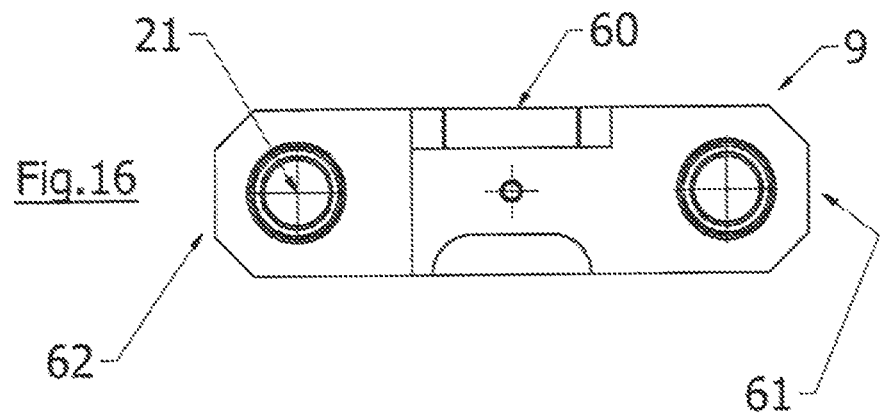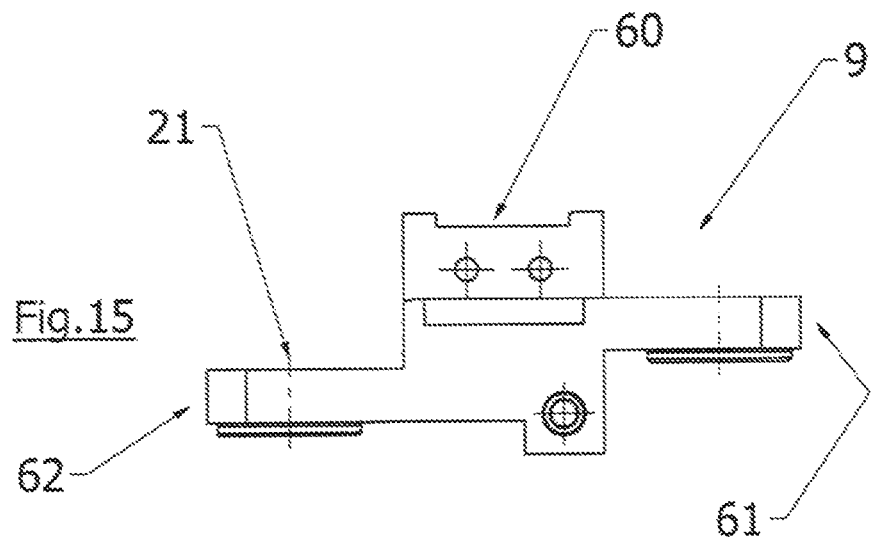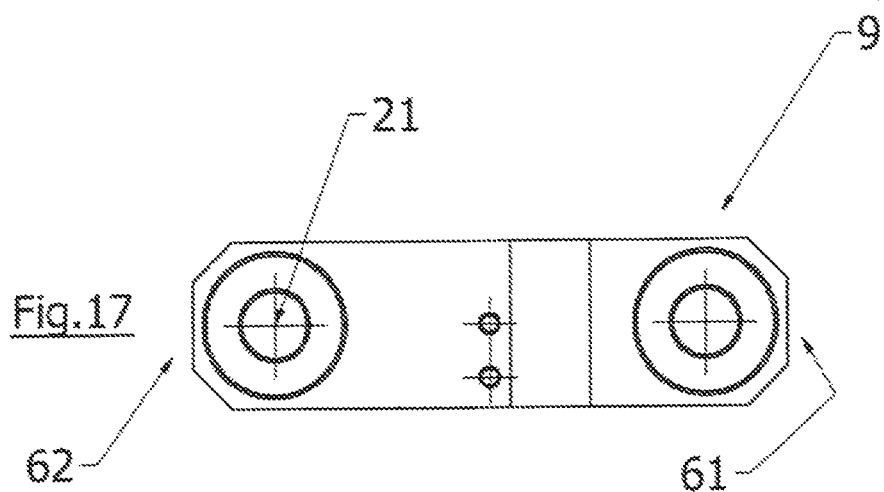

TRANSFER APPARATUS FOR TRANSFERRING AN ITEM

CROSS-REFERENCE TO RELATED APPLICATIONS

This application is the National Stage of International Application No. PCT/NL2010/050637, filed Sep. 29, 2010, which claims the benefit of Netherlands Application Nos. NL 2003570, filed Sep. 29, 2009, and NL 2004278, filed Feb. 22, 2010, the contents of all of which are incorporated by reference herein.

FIELD OF THE INVENTION

The invention relates to a transfer apparatus for transferring an item, specifically a small item like a tablet, pouch, package or the like, and more specifically a single item. The transfer apparatus comprises a rail forming an endless track along which the item is transferred, a transporter which is movable along the rail and comprises at least one gripper for gripping the item, and a driver for moving the transporter along the rail.

BACKGROUND OF THE INVENTION

Due to the fact that the rail forms an endless track, the rail comprises curved sections. A problem of the known transfer apparatus is that that the transporters have difficulties in travelling through the curved sections.

The transfer apparatus is used for grabbing the item of a first surface a releasing the item on a second surface. The first and second surface may be moving. The know transfer apparatus has difficulties in synchronizing the movement of the grippers and the first and/or second surface.

SUMMARY OF THE INVENTION

An object of the invention is to provide an improved transfer apparatus. This object is achieved by a transfer apparatus for transferring an item comprising; a rail forming an endless track along which the item is transferred, a transporter which is movable along the rail and comprises at least one gripper for gripping the item, a driver for moving the transporter along the rail, wherein the transporter comprises at least two carriers engaging the rail and located at a distance from each other, neighbouring carriers are coupled to each other by a coupler, at least one coupler is carrying at least one gripper, the rail comprises a first face and a second face, each carrier comprises a first engage member and a second engage member engaging the first face and a third engage member engaging the second face, the engage members of each carrier are positioned relative to each other such that said engage members form a triangle.

The specific configuration of the transporters allows them to travel more smoothly through the curved sections. Furthermore, it allows an improved synchronization between the grippers and the first and/or second surface.

The rail may comprise at least one inwards curved section which in use is to be positioned adjacent to a rotary table and the rail may be constructed and arranged so that the gripper follows the rotary table.

The gripper may be configured for gripping the item located outside an area enclosed by the track.

The engage members may form an isosceles triangle. The base of the triangle may extend between the first and second engage members.

The first and second face may be positioned at opposite sides of the rail. The first and second engage members may be located outside an area enclosed by the endless track and the third engage member may located inside said area.

The rail may comprise a rail longitudinal axis and the engage members of the carrier may be configured to engage the rail such that rotation of the carrier around the rail longitudinal axis is prevented.

Each carrier may comprise a carrier body which is connected to the first, second and third engage member and has a triangle-like form. The form of the triangle-like carrier body may correspond to the triangle formed by the engage members.

Each connection of the coupler to neighbouring carriers may comprise a coupler axis about which the coupler is pivotable relative to the carrier comprising said connection. The gripper may be located in the middle between the two coupler axes of neighbouring carriers.

The carrier may be configured to rotate about a carrier axis when being moved along curved sections of the rail. The carrier axis may substantially coincide with the coupler axis.

Two neighbouring couplers may be connected to the same carrier and share the same coupler axis.

The transporter may be formed by an endless chain of coupled carriers. The transporter may extend along the entire rail.

The transporter may comprises at least one drive protrusion, the driver may comprise a screw-like surface winded around a screw axis and configured to move the transporter along the rail by engaging and pushing the drive protrusion when the screw-like surface is rotated around the screw axis.

The driver may comprise a cylindrical body comprising a cylinder housing and being rotatable around the cylinder longitudinal axis thereof, and the screw-like surface may be formed by a groove provided in the cylinder housing, said groove having a screw-like form winded around said cylinder longitudinal axis. The cylinder longitudinal axis of the cylindrical body and the screw axis may coincide.

The rail may comprise a rail longitudinal axis and screw axis of the screw-like surface extends substantially parallel to said rail longitudinal axis.

At least one drive protrusions may be connected to the carriers. Each carrier may comprise at least one drive protrusion.

The screw-like surface may simultaneously engage multiple, preferably three, drive protrusions.

The driver may comprise several screw-like surfaces positioned along the track and at a distance from each other.

The pitch of the screw-like surface may be constant. The driver may be configured to rotate the screw-like surface in opposite directions around the screw axis.

A gripper steering may be provided with a first profile for cooperating with a first steering member provided to the gripper for opening and closing the gripper so as to grab or release the item.

The gripper steering may be provided with a second profile for cooperating with a second steering member provided to the gripper for moving an item held by the gripper with respect to the transporter.

The gripper may be movable up and down by the second profile cooperating with the second steering member of the gripper so as to move an item held by the gripper up after grabbing the item and moving the item held by the gripper down before releasing it.

The gripper may comprise an extendable arm which is extendable by the second profile cooperating with the second steering member of the gripper so as to extend the arm and move an item held by the gripper.

The gripper may comprise a pivoting axis so as to pivot the gripper around the pivoting axis by the second profile cooperating with a second steering member of the gripper.

By pivoting the gripper an item held by the gripper may be moveable up and down. By pivoting the gripper an item held by the gripper may be pivotable.

The item held by the gripper may moveable by the gripper in a direction perpendicular to a rail longitudinal axis of the rail.

The gripper may comprise first and second gripper parts for grabbing an item in between the first and second gripper parts. The first and second gripper parts may be tiltable with respect to each other by the first steering member. One of the first and second gripper parts may be moveable with respect to another of the first and second gripper part.

The invention further relates to a method of transferring an item with a transferring apparatus according to the invention.

The invention further relates to a use of a transferring apparatus according to the invention.

The invention further relates to a transfer apparatus for transferring an item, the apparatus comprising:
 a rail forming a track;
 a transporter which is moveable along the rail;
 a driver for moving the transporter along the rail; and,
 a gripper for gripping the item and moveable by the transporter along the rail.

The transfer apparatus may be used for transporting small items like a tablet, pouch, package or the like, and more specifically a single item. The rail may form an endless track along which the item is transferred from a to b.

There is a need for steering the gripper.

Therefore there is a need is to provide an improved transfer apparatus. This object is achieved in a transfer apparatus for transferring an item, the apparatus comprising:
 a rail forming a track;
 a transporter which is moveable along the rail;
 a driver for moving the transporter along the rail; and,
 a gripper for gripping the item and moveable by the transporter along the rail; wherein,
 a gripper steering is provided with a first profile for cooperating with a first steering member provided to the gripper for opening and closing the gripper so as to grab or release the item.

The gripper steering may be provided with a second profile for cooperating with a second steering member provided to the gripper for moving an item held by the gripper with respect to the transporter.

The gripper may be movable up and down by the second profile cooperating with the second steering member of the gripper so as to move an item held by the gripper up after grabbing the item and moving the item held by the gripper down before releasing it.

The gripper may comprise an extendable arm which is extendable by the second profile cooperating with the second steering member of the gripper so as to extend the arm and move an item held by the gripper.

The gripper may comprise a pivoting axis so as to pivot the gripper around the pivoting axis by the second profile cooperating with a second steering member of the gripper.

By pivoting the gripper an item held by the gripper may be moveable up and down. By pivoting the gripper an item held by the gripper may be pivotable.

The item held by the gripper may moveable by the gripper in a direction perpendicular to a rail longitudinal axis of the rail.

The gripper may comprise first and second gripper parts for grabbing an item in between the first and second gripper parts. The first and second gripper parts may be tiltable with respect to each other by the first steering member. One of the first and second gripper parts may be moveable with respect to another of the first and second gripper part.

The speed of the transporter can be adjusted with a speed adjustment driver comprising a screw-like surface winded around a screw axis and configured to move the transporters along the rail by engaging and pushing a drive protrusions.

The invention further relates to a method of transferring an item comprising:
 moving a transporter along a track over a rail with a driver;
 opening a gripper moveable by the transporter along the rail by a first profile of a gripper steering cooperating with a first steering member; wherein the method comprises,
 grabbing the item by the gripper by
 closing the gripper by the first profile of the rail cooperating with the first steering member.

BRIEF DESCRIPTION OF THE DRAWINGS

The accompanying drawings, which are incorporated herein and form part of the specification, illustrate embodiments of the invention, and together with the description, further serve to explain the principles of the invention and to enable a person skilled in the art to make and use the invention.

DETAILED DESCRIPTION OF THE INVENTION

Figure 1:
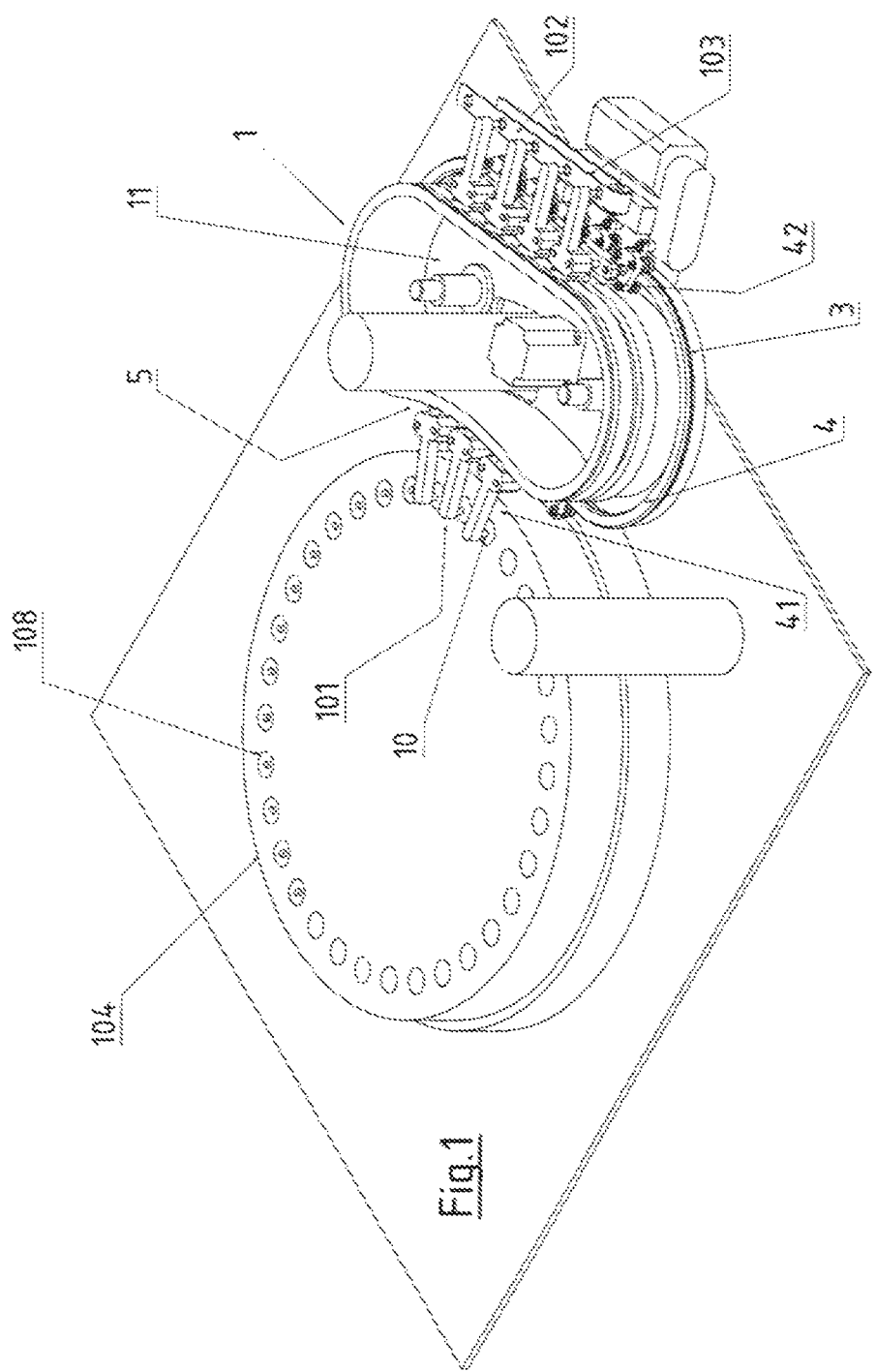
FIG. 1 schematically shows a perspective view of an embodiment of a transfer apparatus according the invention, FIG. 2 schematically shows a top view of the transfer apparatus of FIG. 1, FIG. 3 schematically shows a perspective view of a second embodiment of a transfer apparatus according the invention, FIG. 4 schematically shows a top view of the transfer apparatus of FIG. 3, FIG. 5 schematically shows a perspective view of the driver of the transfer apparatus of FIG. 1, FIG. 6 schematically shows a further perspective view of the transfer apparatus of FIG. 1, FIG. 7 schematically shows a perspective view of the driver of the transfer apparatus of FIG. 3, FIG. 8 schematically shows a perspective view of the transporter of the transfer apparatus of FIG. 1, FIG. 9 schematically shows a further perspective view of the transporter of the transfer apparatus of FIG. 1, FIG. 10 schematically shows a perspective view of the carrier of the transfer apparatus of FIG. 3, FIG. 11 schematically shows a side view of the carrier of FIG. 10, FIG. 12 schematically shows a top view of the carrier of FIG. 10, FIG. 13 schematically shows a bottom view of the carrier of FIG. 10, FIG. 14 schematically shows a perspective view of the coupler of the transfer apparatus of FIG. 3, FIG. 15 schematically shows a side view of the coupler of FIG. 14, FIG. 16 schematically shows a top view of the coupler of FIG. 14, FIG. 17 schematically shows a bottom view of the coupler of FIG. 14, FIG. 18 schematically shows a side view of the carrier of FIG. 10 engaging the rail, FIG. 19 schematically shows a perspective view of the carrier of FIG. 10 engaging the rail.
Figure 2:
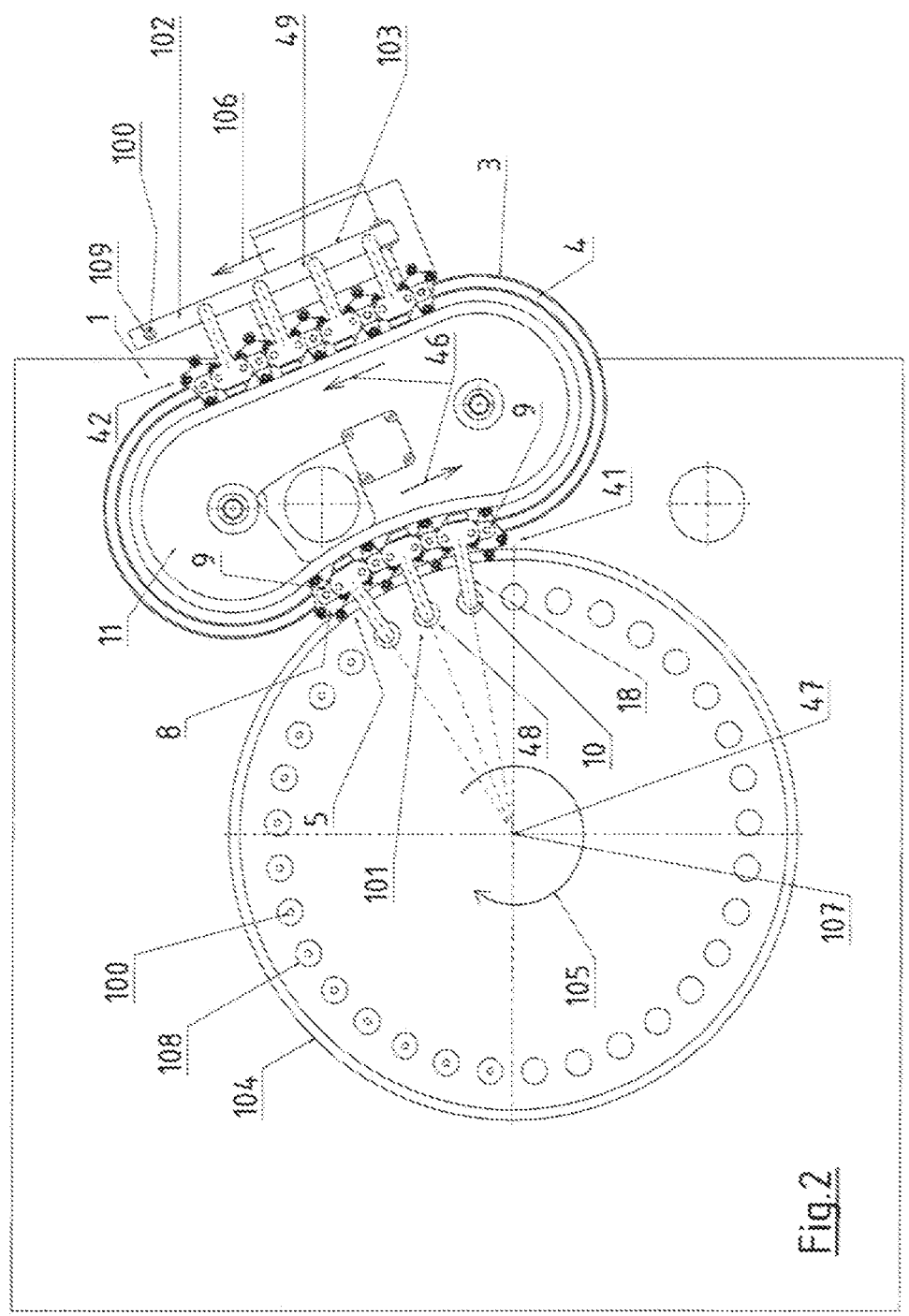

The FIGS. 1 and 2 shows a perspective view and of an embodiment of a transfer apparatus according the invention. The transfer apparatus 1 is configured to transfer single items 100.

The items 100 are positioned on a first surface 101 formed by a rotary table 104. The rotary table 104 rotates around a table axis 107 as indicated by arrow 105. The transfer apparatus 1 is configured to transfer the items 100 to a second surface 102 located at a distance from the first surface 101. The second surface 102 is formed by an endless belt 103 transporting the received items 100 in the direction indicated by arrow 106.

The transfer apparatus 1 comprises a rail 3 forming an endless track 4 along which the item 100 is transferred. The endless track 4 encloses an area 11. The endless track 4 comprises an inwards curved section 5 positioned adjacent to the rotary table 104. The rail 3 is constructed and arranged so the grippers 10 follow the rotary table 104. The part of the endless track 4 extending along the endless belt 103 follows a straight line.

Figure 3:
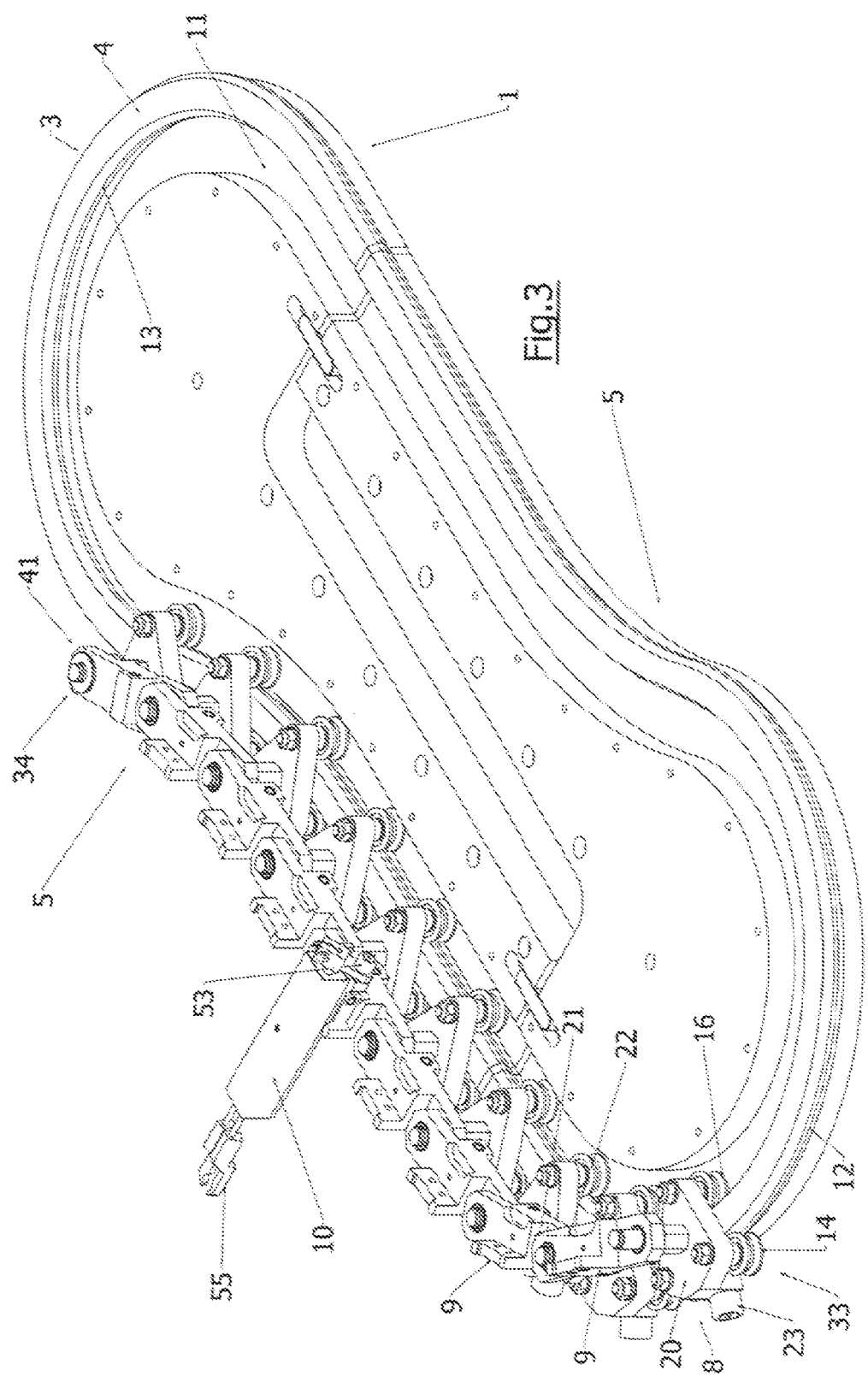

It will be clear that the second surface 102 also may be formed by a second rotary table is stead of the endless belt 103. For this the transfer apparatus 1 would require a second inwards curved section, as shown in FIG. 3. The shape of an inwards curved section 5 of the transfer apparatus 1 corresponds to the circular dimensions of the rotary table 104 used.

The transfer apparatus 1 further comprises a first transporter 41 and a second transporter 42 which are movable along the rail 3 and a driver 7 (see FIG. 5) for driving the transporters 41, 42 along the rail 3. The transporters 41, 42 are interconnected such that both transporters 41, 42 can be driven by one driver 7. For providing a clear view on the construction of the transfer apparatus 1, said interconnection is left out.

The interconnection may by formed by additional carriers 8 coupled to each other and to the transporters 41, 42 by additional couplers 9. This way the first and second transporter 41, 42 are integrated and form an endless chain of coupled carriers 8. Said endless transporter 41, 42 extends along the entire rail 3. All or part of the couplers 9 may be provided with a gripper 10.

The first transporter 41 comprises four carriers 8 engaging the rail 3 and located at a distance from each other. The second transporter 42 comprises five of such carriers 8. In each transporter 41, 42, neighbouring carriers 8 are coupled to each other by a coupler 9 carrying a gripper 10 for gripping one of the items 100.

In use the transporters 41, 42 are moved along the rail 3 as indicated by the arrows 46. The transfer apparatus 1 is configured such that the movement of the transporters 41, 42 corresponds to the movement of the first surface 101 and to the movement of the second surface 102 when passing the rotary table 104 and the endless belt 103, respectively. When passing the inwards curved section 5, the grippers 10 are directed to a centre point 47. More specifically, each gripper 10 comprises a gripper arm 18 which directs to the centre point 47 when passing the inwards curved section 5. Said centre point 47 coincides with the table axis 107.

The rotary table 104 comprises first item regions 108 positioned along the circumference of the rotary table 104. Each item 100 located on the first surface 101 is positioned in a different first item region 108. When passing the first surface 101, the speed of the grippers 10 equals that of the first surface 101 and the gripper arms 18 are located above the first item regions 108. Each gripper arms 18 picks up an item 100 when passing the first surface 101. The transfer apparatus 1 is configured such that each gripper 10 picks up an item 100 when passing the same location 48 along the track 4. This means that there is only one grabbing location 48 along the track 4 where the grippers 10 pick up an item 100 of the first surface 101. The transfer apparatus 1 may also be provided with further grabbing locations 48 along the same or further surfaces.

After picking up an item 100, the grippers 10 holding the items 100 are moved along the track 4 towards the second surface 102. The second surface 102 is provided with second item regions 109. When moved along the second surface 102, the speed of the grippers 10 equals that of the second surface 102. At a specific releasing location 49 along the track 4, the grippers 10 place the item 100 in a corresponding second item region 109. Each of the items 100 placed in a different second item region 109. The transfer apparatus 1 is configured such that each gripper 10 places down a held item 100 when passing the same location 49 along the track 4. This means that there is only one releasing location 49 along the track 4 where the grippers 10 place down an item 100. The transfer apparatus 1 may also be provided with further releasing locations 49 along the same or further surfaces.

By gathering the data indicating in which item region 108, 109 each item 100 has been and are positioned, the transfer apparatus 1 comprises a tracking and tracing system of the individual items 100.

Figure 4:
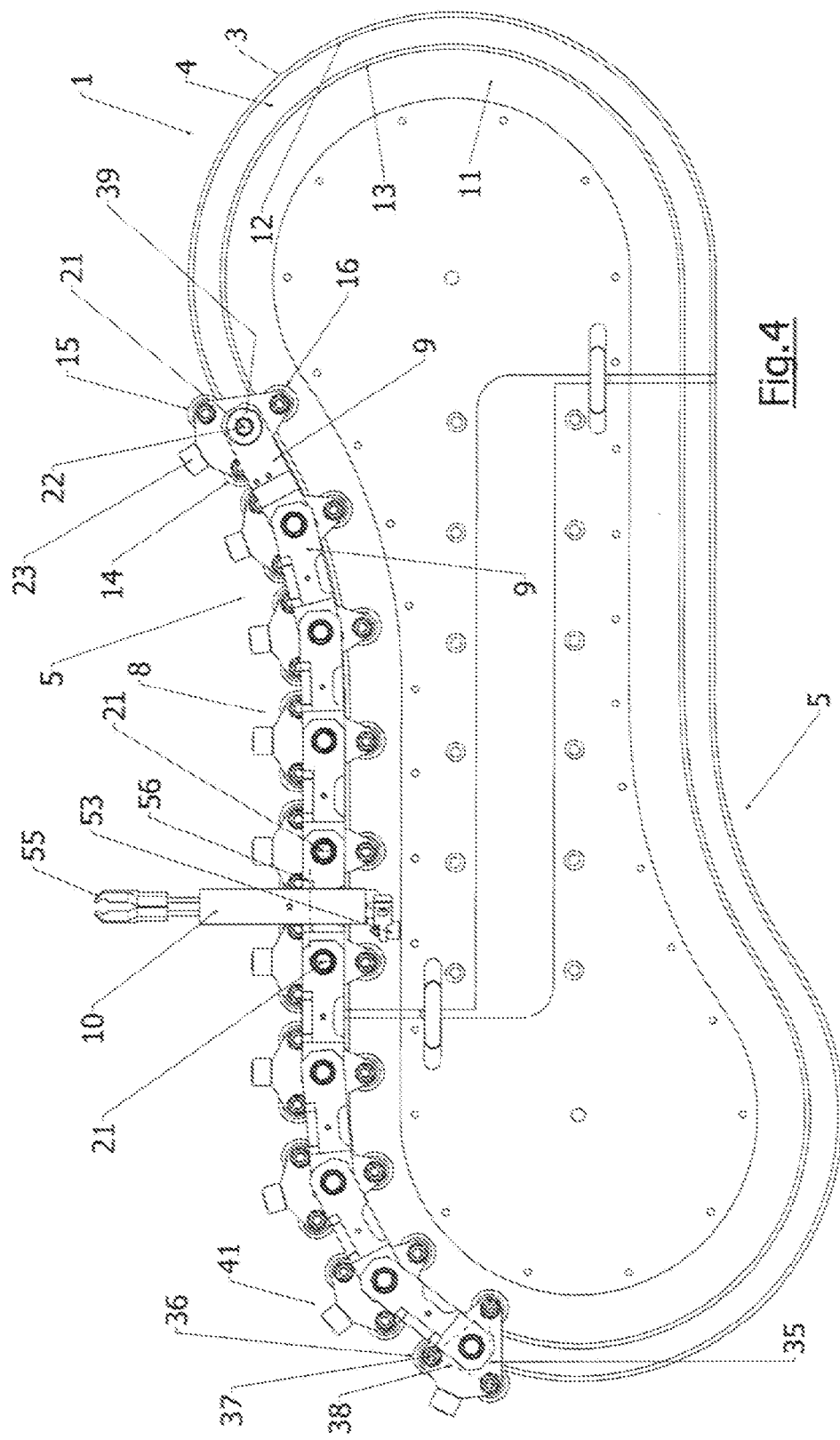

FIGS. 3 and 4 show a perspective view and top view of a second embodiment of a transfer apparatus according the invention, respectively. The endless track 4 comprises two inwards curved sections 5. The transfer apparatus 1 comprises an endless transporter 41. For providing a clear sight on the construction of the transfer apparatus 1, only part of the transporter 41 is shown. The part of the endless transporter 41 shown comprises ten carriers 8. Neighbouring carriers 8 are connected by a coupler 9. The couplers 9 are configured to carry a gripper 10. Only one gripper 10 is shown, but it will be clear the transporter 41 may be carrying additional grippers 10.

The rail 3 comprises a first face 12 and a second face 13. Each carrier 8 comprises a first engage member 14 and a second engage member 15 engaging the first face 12 and a third engage member 16 engaging the second face 13. The engage members 14, 15, 16 of each carrier 8 are positioned relative to each other such that said engage members 14, 15, 16 form a triangle 35, more specifically an isosceles triangle. The base 38 of the triangle 35 extends between the first and second engage members 14 and 15.

Each engage member 14, 15, 16 is formed by a roller 36 rotatable about a roller axis 36. As indicated in FIG. 4, each of the three roller axes 36 is positioned at a different vertex of the triangle 35.

The first and second face 12, 13 are positioned at opposite sides of the rail 3. Each carrier 8 comprises a carrier body 20 which is connected to the three engage members 14, 15, 16 and has a triangle-like form. The first and second engage members 14, 15 are located outside the area 11 enclosed by the endless track 4 and the third engage member 16 is located inside said area 11. The form of the triangle-like carrier body 20 corresponds to the triangle 35 formed by the three engage members 14, 15, 16 and both triangles are oriented the same way.

Each connection 39 of the coupler 9 to neighbouring carriers 8 comprises a coupler axis 21 about which the coupler 9 is pivotable relative to the carrier 8 comprising said connection 39. The carriers 8 are configured to rotate about a carrier axis 22 when being moved along curved sections 5 of the rail 3. The carrier axis 22 coincides with the coupler axis 21. Neighbouring couplers 9 are connected to the same carrier 8 and share the same coupler axis 21. As shown in FIG. 4, the gripper 10 is located in the middle between the two coupler axes 21 of neighbouring carriers 8.

The gripper 10 comprises a gripping member 55 for grabbing the item. The gripping member 55 comprises two gripping parts for grabbing the item between said gripping parts. The gripper 10 comprises a pivot axis 56 about which the gripper 10 is pivotable for grabbing and releasing the item 100.

Figure 5:
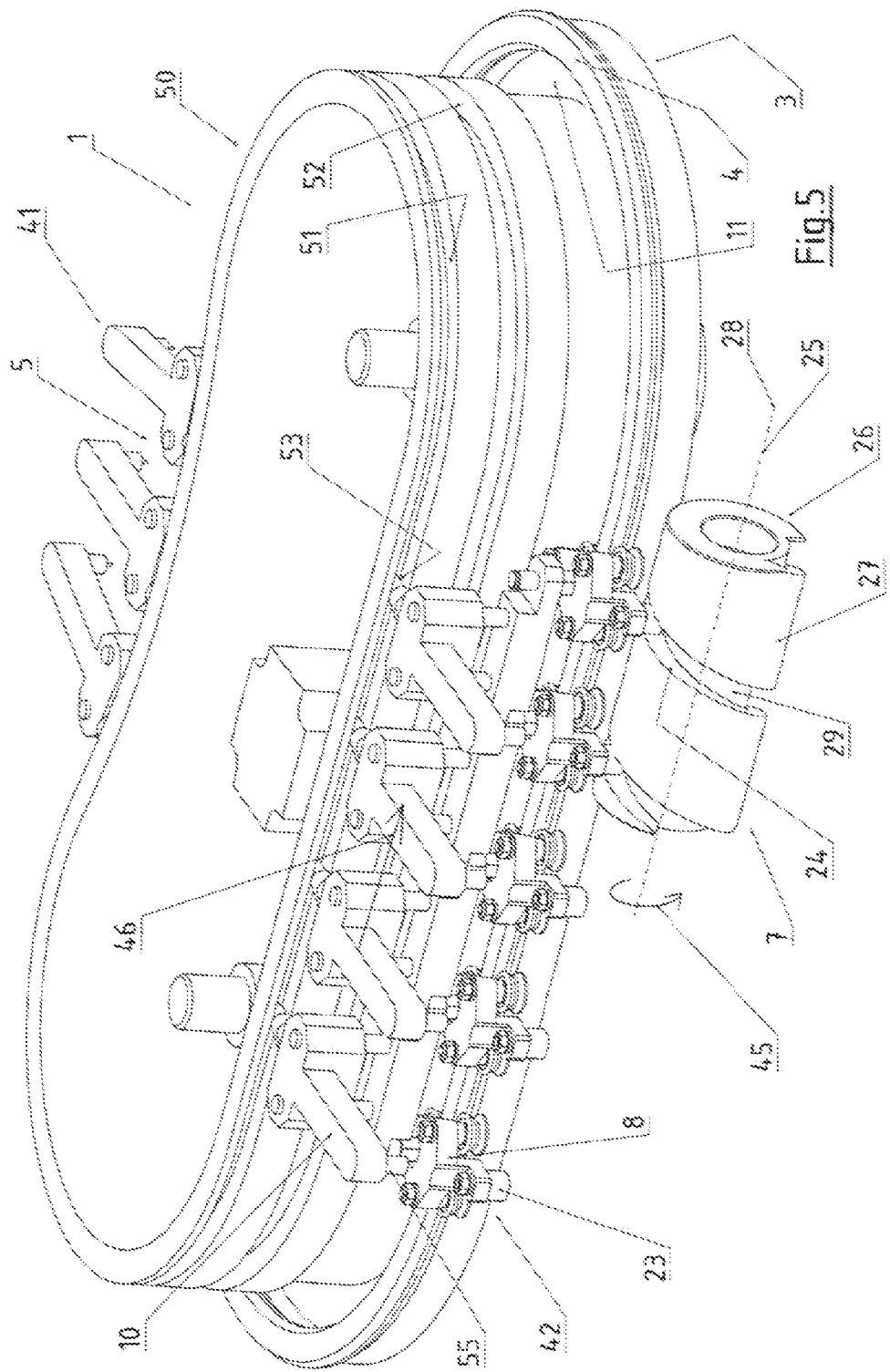

FIG. 5 shows a perspective view of the driver of the transfer apparatus of FIG. 1. Each of the transporters 41, 42 comprise several drive protrusions 23. The drive protrusions 23 are connected to the carriers 8. More specifically, each carrier 8 comprises a drive protrusion 23. It is also possible that only a part of the carriers 8 are provided with a drive protrusion 23.

The driver 7 comprises a screw-like surface 24 winded around a screw axis 25 and configured to move the transporters 41, 42 along the rail by engaging and pushing the drive protrusions 23 when the screw-like surface 24 is rotated around the screw axis 25. Said rotation of the screw-like surface 24 is indicated by arrow 45. The movement of the second transporter 42 is indicated by arrow 46.

The driver 7 comprises a cylindrical body 26 comprising a cylinder housing 27 and being rotatable around the longitudinal axis 28 thereof. The screw-like surface 24 is formed by a groove 29 provided in the cylinder housing 27. Said groove 29 has a screw-like form winded around said longitudinal axis 28. As a result of this, the longitudinal axis 28 of the cylindrical body 26 and the screw axis 25 coincide. The rail 3 comprises a rail longitudinal axis and the screw axis 25 of the screw-like surface 24 extends substantially parallel to said rail longitudinal axis. The longitudinal axis 28 of the cylindrical body 26 extends substantially parallel to said rail longitudinal axis.

The driver 7 may comprise several screw-like surfaces 24 positioned along the track 4 and at a distance from each other. This ensures that the transporters 41, 42 are subjected to lower stress and strain.

The pitch of the screw-like surface 24 is constant. The driver 7 is configured to rotate the screw-like surface 24 in opposite directions around the screw axis 25. As a result of this, the driver 7 is able to move the transporters 41, 42 in opposite directions.

The drive protrusions 23 of the transporters 41, 42 are directed downwards. As a result of this, the screw-like surface 24 is located under the transporters 41, 42.

Furthermore, a gripper steering 50 is provided to steer the grippers 10. The gripper steering 50 comprises a first profile 51 and a second profile 52 extending along the rail 3. The profiles may be provided in a plastic material or a metal material. The profiles 51, 52 may follow the shape of the rail 3. The grippers 10 are configured to be in contact and to follow the profiles 51, 52. The grippers 10 comprise first and second steering members 53, 54 which are in contact and follow the profiles 51, 52. The shape of the profiles 51, 52 move the steering members 51, 52 for steering the grippers 10. This way, the controller profiles 51, 52 ensure that the grippers 10 grab an item 100 at the grabbing location 48 and release the item 10 at the releasing location 49. The behaviour of the grippers 10 is adjustable by adjusting the shape of the profiles 51, 52. The profiles 51, 52 are located in the area 11 enclosed by the endless track 4.

The transfer apparatus may be divided in two parts. The first part being the part comprising the profiles and the second part the rail and carriers. In an embodiment the transfer apparatus may be provided with an actuator to move the first part as a whole up with respect to the second part. All grippers may than release there items. The latter can be advantageously in case of emergency.

Figure 6:
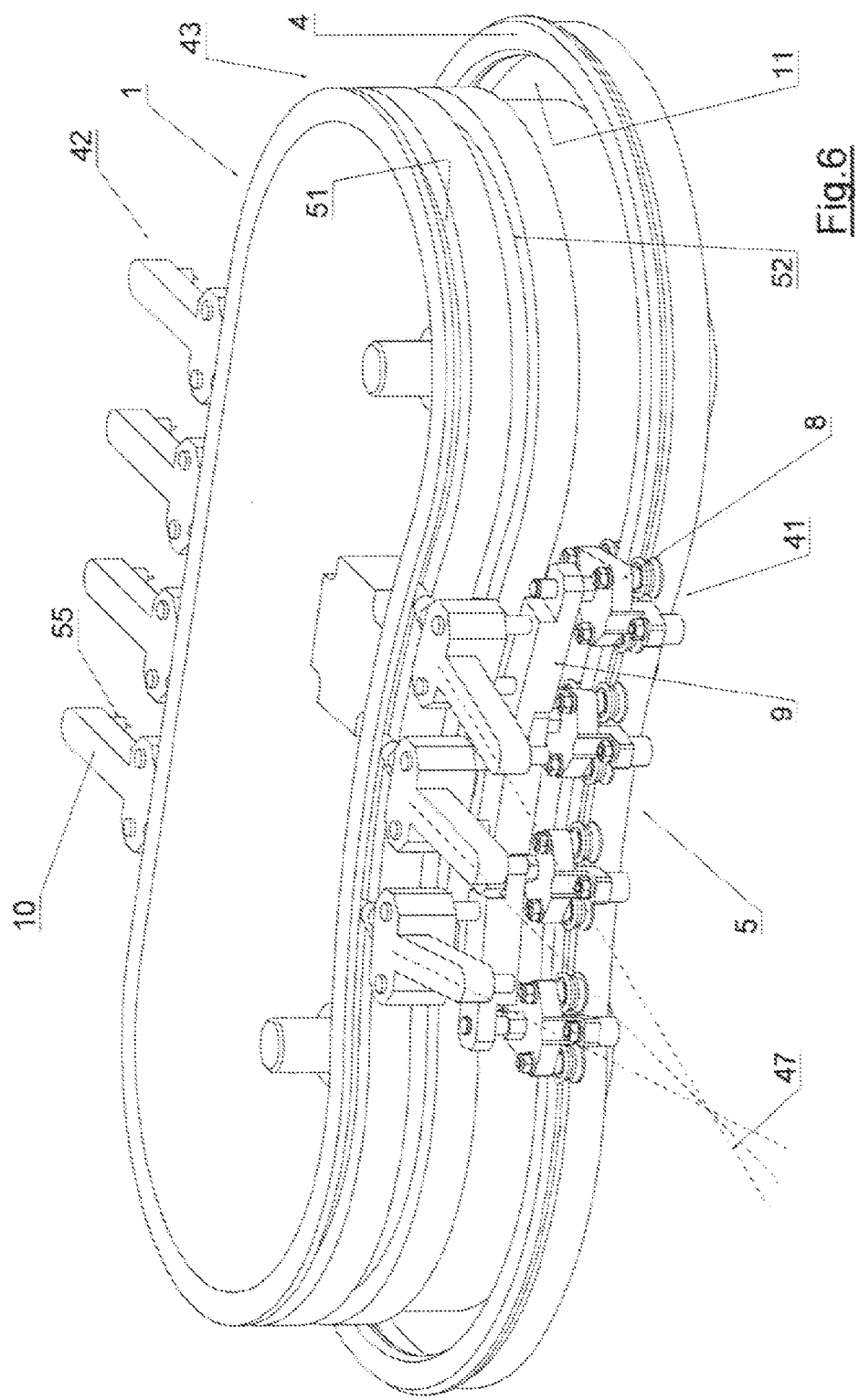

FIG. 6 shows a further perspective view of the transfer apparatus of FIG. 5. The first transporter 41 is located in the inwards curved section 5. The transporters 41, 42 are configured such that the grippers 10 are directed towards a centre point 47 when positioned in said inwards curved section 5. As shown in FIG. 1, in use said centre point 47 coincides with the table axis 107 of the rotary table 104.

FIG. 7 shows a perspective view of the driver of the transfer apparatus of FIG. 3, wherein only part of the endless transporter 41 is shown. As shown in FIG. 4, the drive protrusions 23 are directed outwards. The screw-like surface 24 is located at the side of the rail 3. The rail 3 comprises a rail longitudinal axis and the screw axis 25 of the screw-like surface 24 extends substantially parallel to said rail longitudinal axis. The longitudinal axis 28 of the cylindrical body 26 extends substantially parallel to said rail longitudinal axis.

The FIGS. 8 and 9 show a perspective view of part of the transporter of the transfer apparatus of FIG. 1. Each gripper 10 comprises a first protrusion 53 and a second protrusion 54. The protrusions may cooperate to open the gripper or to change the position of the gripper 10.

Figure 10:
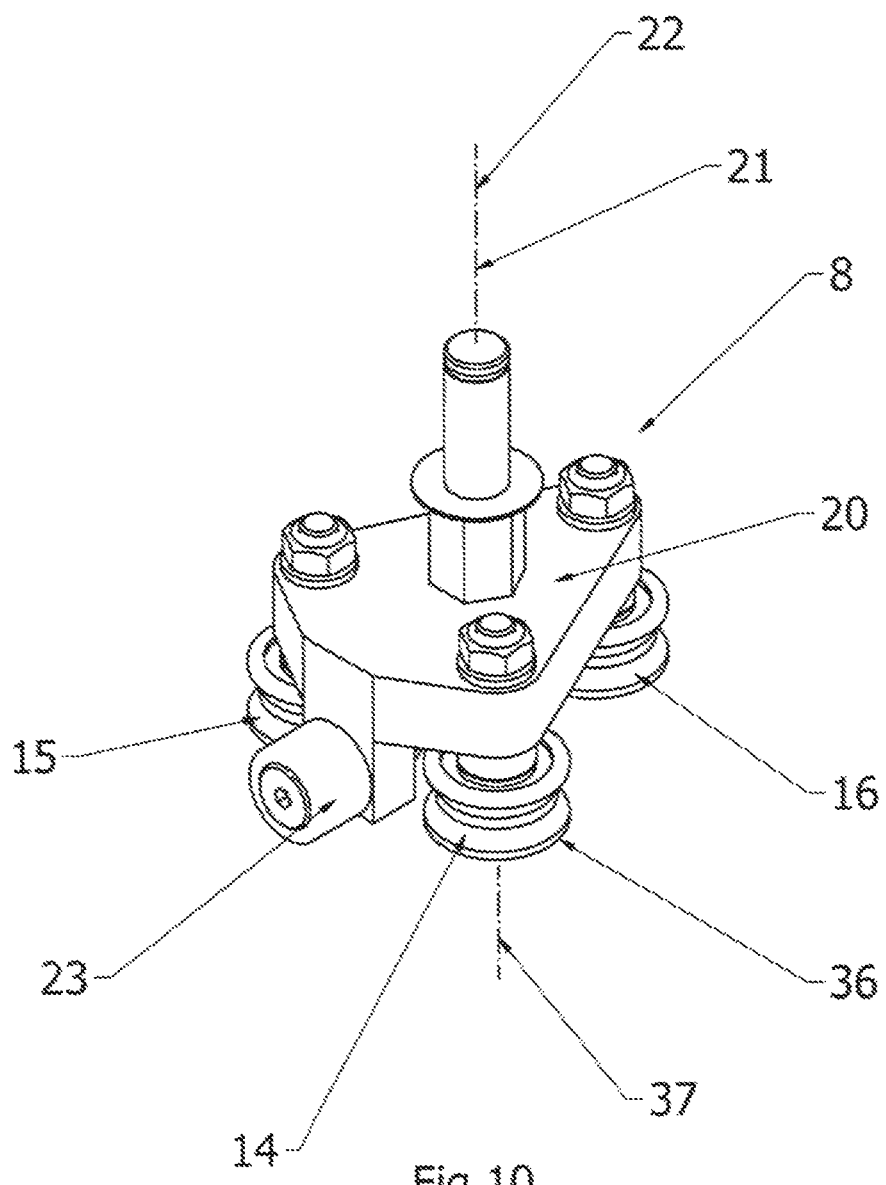

FIG. 10 shows a perspective view of the carrier of the transfer apparatus of FIG. 3.

The FIGS. 11-13 show a side view, a top view and a bottom view of the carrier of FIG. 10, respectively. The triangle base 38 of the isosceles triangle 35 is formed by the first and second engage members 14, 15.

Figure 14:
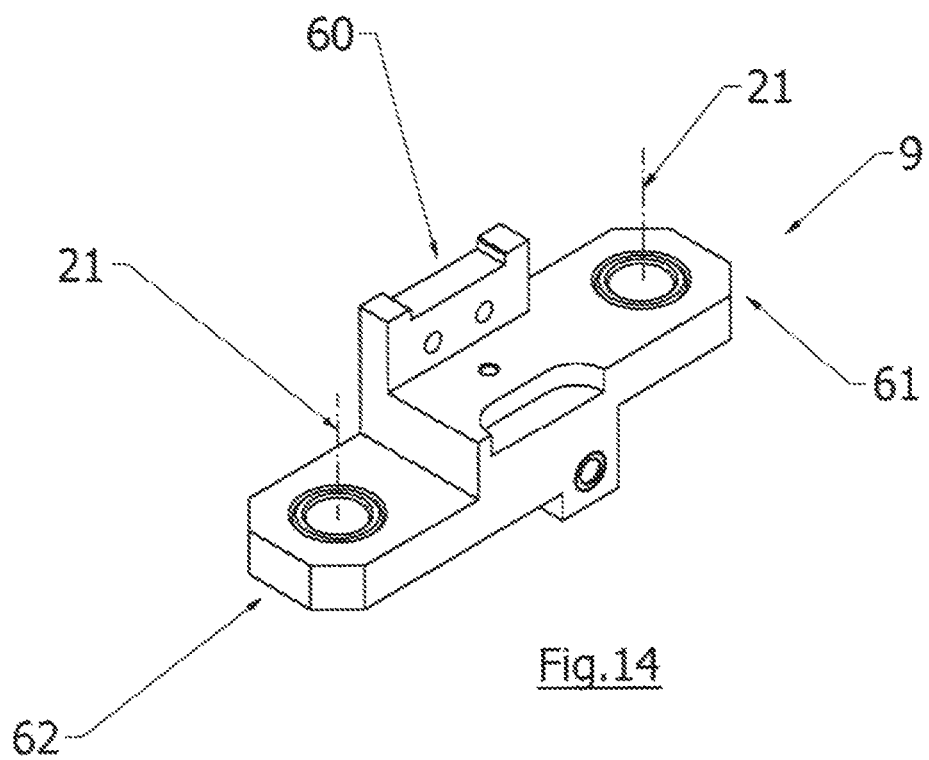

FIG. 14 shows a perspective view of the coupler of the transfer apparatus of FIG. 3. The coupler 9 comprises a first coupling end 61 and a second coupling end 62, each to be coupled to a different one of two neighbouring carriers 8 such that the coupler 9 is pivotable relative to said carrier and about coupler axis 21. A gripper receiver 60 is provided for receiving a gripper 10.

The FIG. 15-17 shows a side view, top view and bottom view of the coupler of FIG. 14, respectively.

Figure 18:
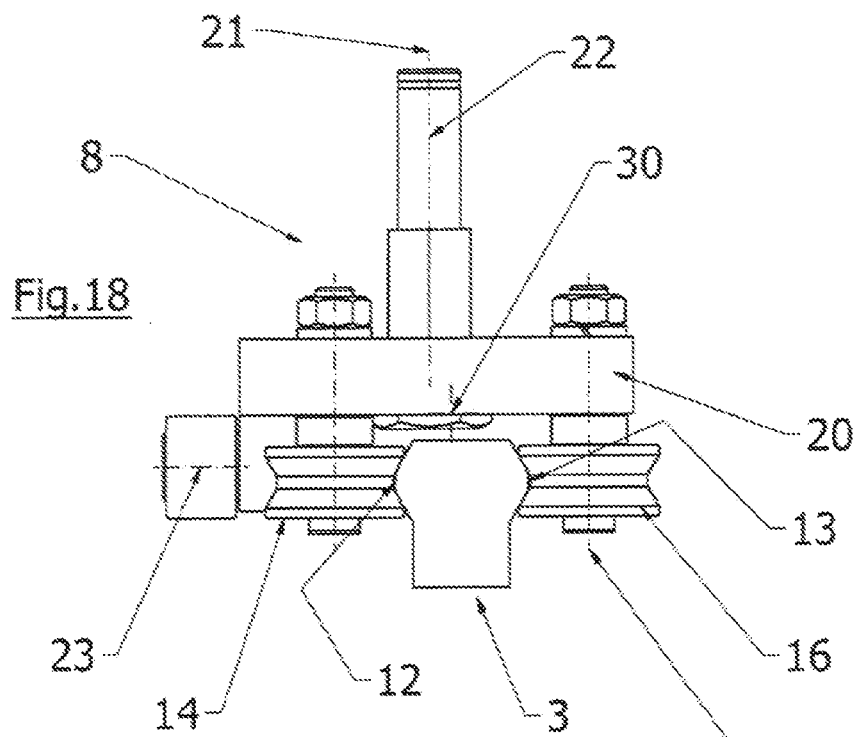
Figure 19:
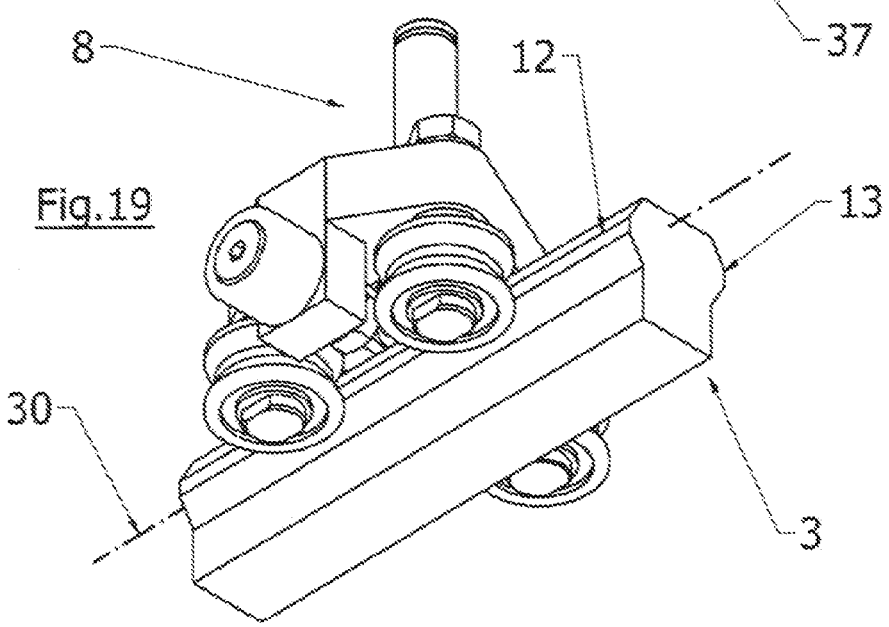

FIGS. 18 and 19 show a side view and a perspective view of the carrier of FIG. 10 engaging the rail, respectively. The rail 3 comprises a rail longitudinal axis 30 and the three engage members 14, 15, 16 engage the rail 3 such that rotation of the carrier 8 around the rail longitudinal axis 30 is prevented. This provides stability which is specifically useful when a gripper 10 grabs or releases an item 100.

Figure 20:
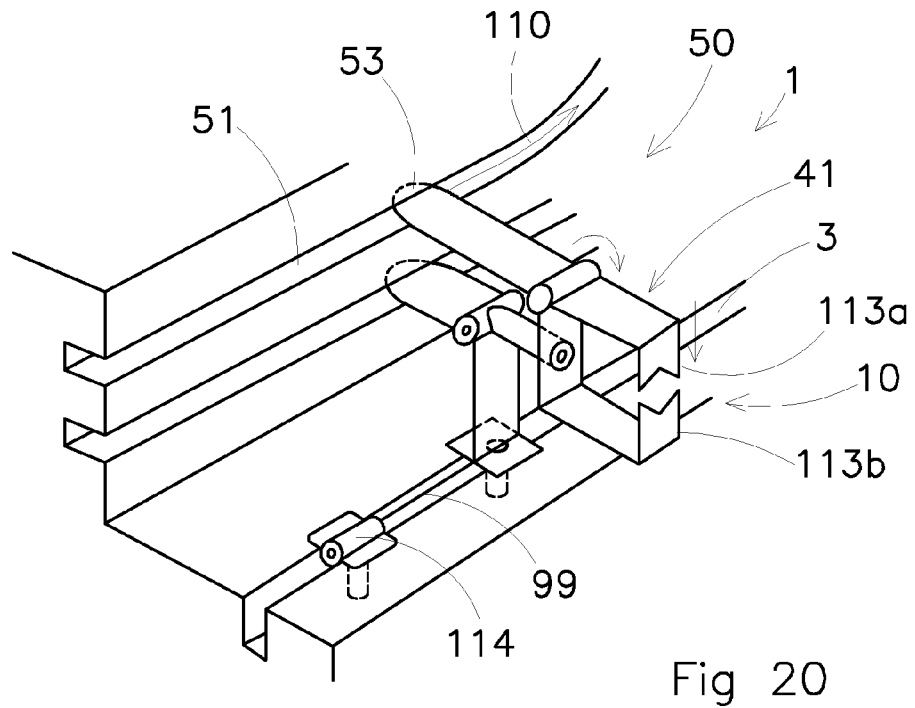
FIG. 20 shows a perspective view on an intersection of a transfer apparatus according to a further embodiment of the invention.

FIG. 20 shows a perspective view on an intersection of transfer apparatus 1 according to a further embodiment of the invention. The transfer apparatus 1 comprises a rail 3 forming a track which may be an endless track. A transporter 41 is moveable along the rail and is provided with a gripper 10 for gripping an item. A gripper steering 50 is provided with a first profile 51 for cooperating with a first steering member 53 provided to the gripper 10 for opening and closing the gripper 10 so as to grab or release the item. The gripper will be closed if the gripper steering member 53 is moved through the profile 51 upwards as depicted by arrow 110. The gripper may be moved by the first transporter 41 and the second transporter 42 which are moveable along a rail 3 (see FIG. 5). The first and the second transporter 41, 42 may be connected with carriers 8. The grippers may be positioned on the carriers or the first and second connector 41, 42.

Alternatively the grippers may be positioned on slider of a FlexLink® system which is obtainable from FlexLink AB Götenburg Sweden. For example the slider 114 may be connected to other sliders via a connection, e.g. cable 99. The cable allows for maximal freedom between the sliders 114 so that the sliders are moveable along a track which is moveable in three dimensions. The connection may also be a chain.

Figure 21:
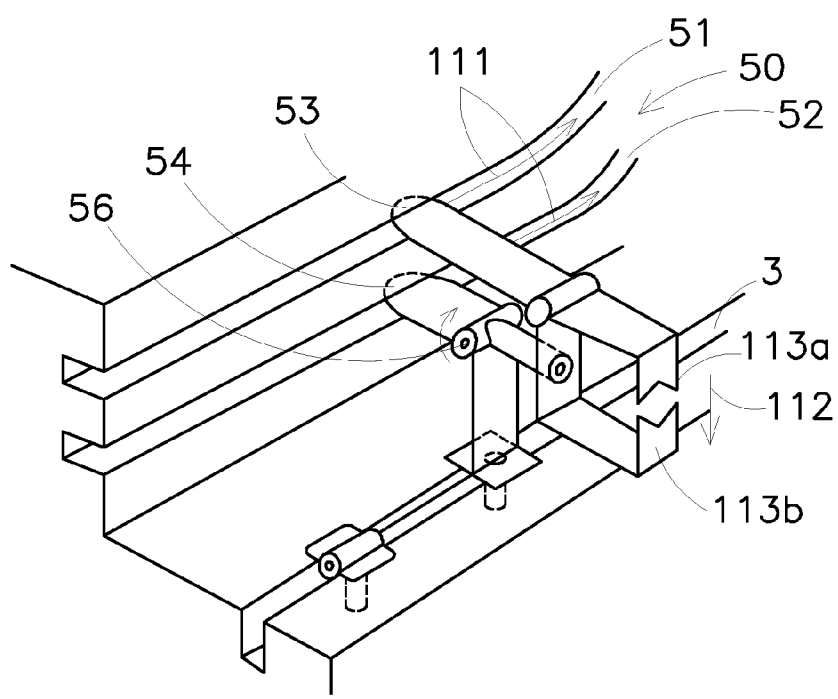
FIG. 21 shows a perspective view on an intersection of a transfer apparatus according to yet a further embodiment of the invention.

The gripper steering 50 may be provided with a second profile 52 for cooperating with a second steering member 54 connected to the gripper 10. The second steering member 54 may be connected to the gripper 10 for moving the gripper with respect to the rail 3. If the first and second steering members 53, 54 (see FIG. 21) are moved up in the first and second profile 51, 52 as depicted by arrows 111 the gripper is moved down 112. An item held by the gripper may be moved up after grabbing the item and may be moved down before releasing the item. A relative movement between the first and second steering members 53, 54 may open or close the gripper.

The gripper may have a pivoting axis 56 so as to allow the gripper 10 to pivot around the pivoting axis and move the gripper up and down. The pivoting axis may be parallel to a main direction of the first profile for this purpose. An item held by the gripper 10 may be pivotable as well. First and second gripper parts 113a, 113b of the gripper 10 may be moveable with respect to another of the first and second gripper part 113a, 113b by having the first and second profile moving the first and second steering members in opposite direction. Such opposite movement is advantageously in case of grabbing an item.

Figure 22:
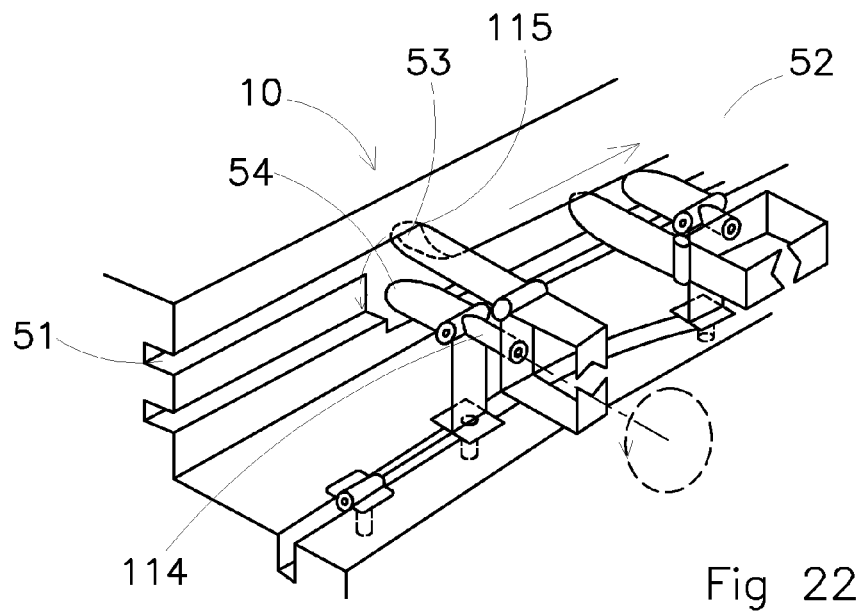
FIG. 22 shows a perspective view on an intersection of a transfer apparatus according to another embodiment of the invention.
Figure 23:
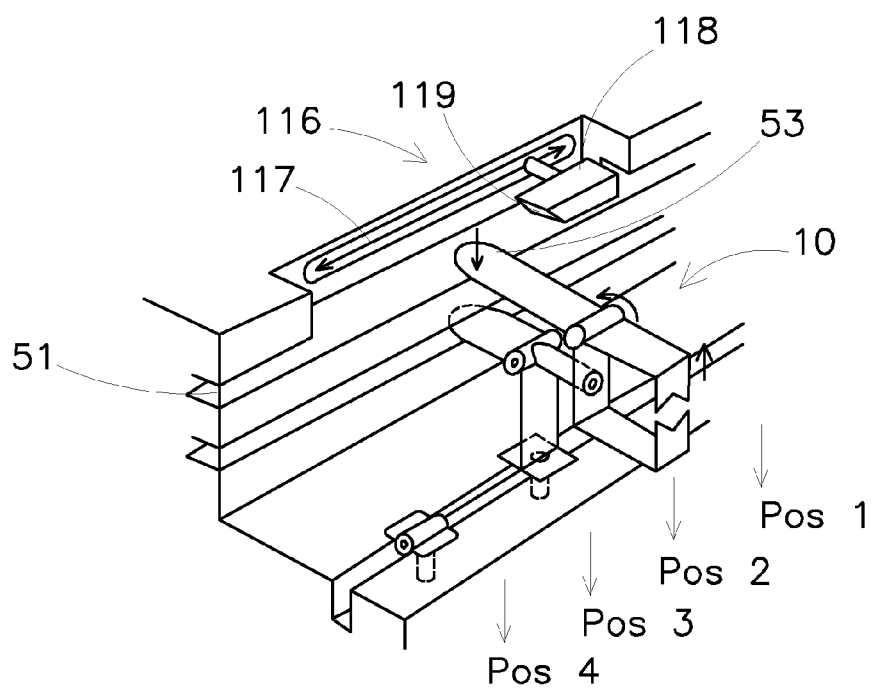
FIG. 23 shows a perspective view on an intersection of a transfer apparatus according to a yet another embodiment of the invention.

Another pivoting axis 114 may be perpendicular to the main direction of the rail 3 as shown in FIG. 22. The gripper 10 can be tilted by slowing down or stopping the first steering member 53 while the gripper 10 continues moving. For this purpose the first profile 51 is provided with a stop 115 and after the stop both steering members 53, 54 will continue moving in the second profile 52.

The first profile my have a first profile adjustment member 116 for adjusting the first profile 52 so as to open the gripper at a required position (pos 1, pos 2, pos 3 or pos 4). The first profile adjustment member 116 may have a slider 118 which is moveable 117 along the first profile 52. The slider 118 may be provided with a tilted slope 119 which in cooperation with the first steering member 53 functions to open the gripper 10 at one of the positions (pos 1, pos 2, pos 3 or pos 4). By moving the slider 118 the gripper 10 can be opened at the required position (pos 1, pos 2, pos 3 or pos 4). It must be understood that a profile adjustment member similar to the first profile adjustment member can also be used to adjust the second profile simultaneously with, or separately from the first profile. This may be required, for example to pivot the gripper 10 at an adjustable position.

Figure 24:
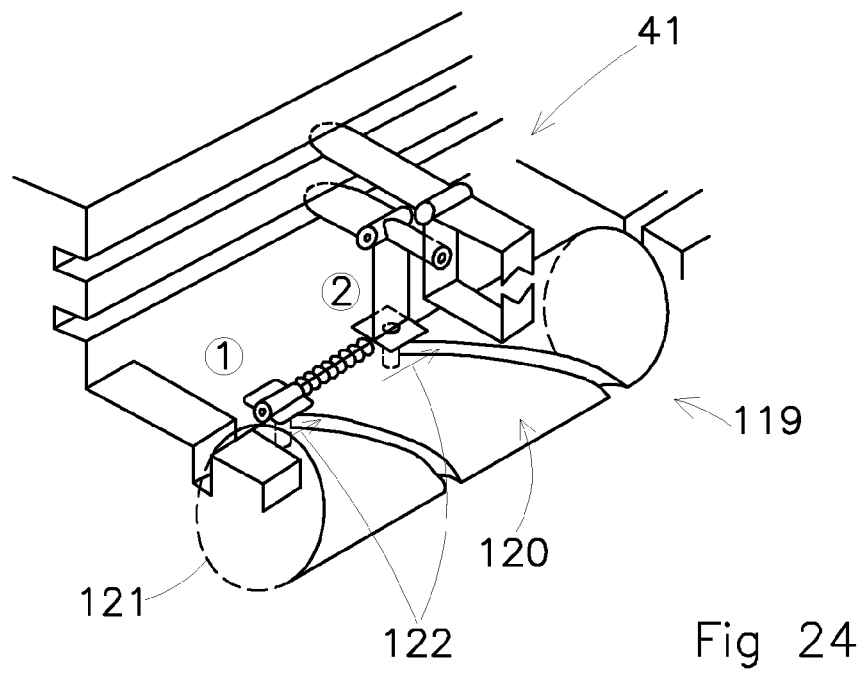
FIG. 24 shows a perspective view on an intersection of a transfer apparatus according to a further embodiment of the invention.

The speed of the transporter 41 can be adjusted with a speed adjustment driver 119 (see FIG. 24) with a screw-like surface 120 winded around a screw axis 121 and configured to move the transporters 41 along the rail 3 by engaging and pushing the drive protrusions 122 through depressions in the screw like surface 120 while rotating the screw like surface 119 with a motor not shown.

Figure 25:
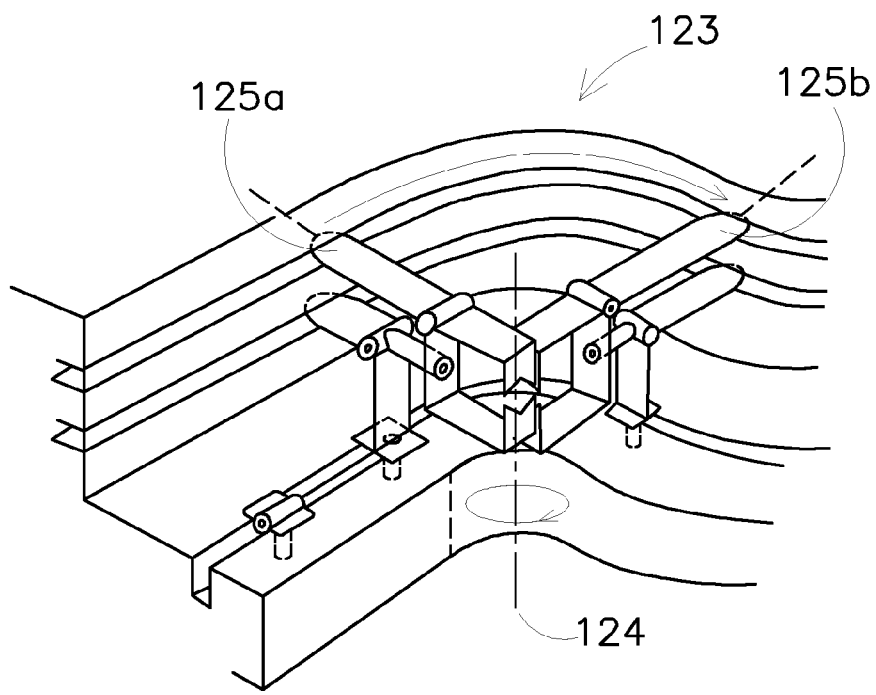
FIG. 25 shows a perspective view on an intersection of a transfer apparatus according to an embodiment of the invention, and, FIGS. 26a to 26f disclose different configurations in which the transferring apparatus can be configured for grabbing and/or dropping items. In the abovementioned figures, corresponding reference numbers are used for corresponding features.
Figure 26A:
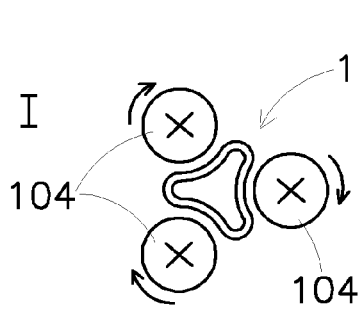
Figure 26B:
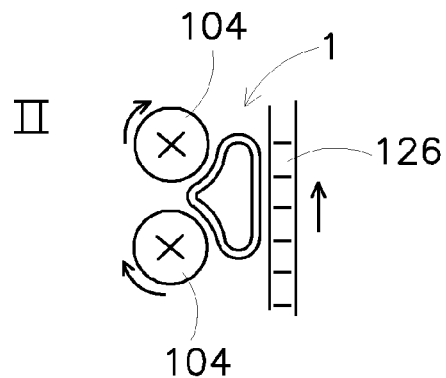
Figure 26C:
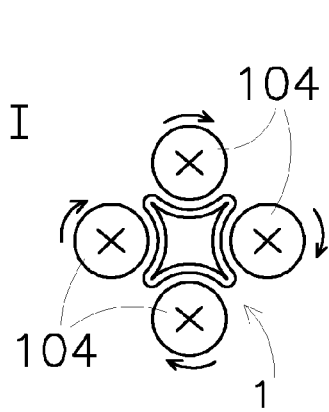
Figure 26D:
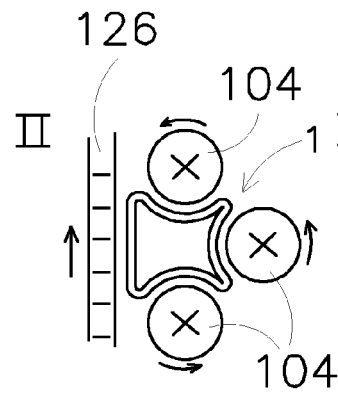
Figure 26E:
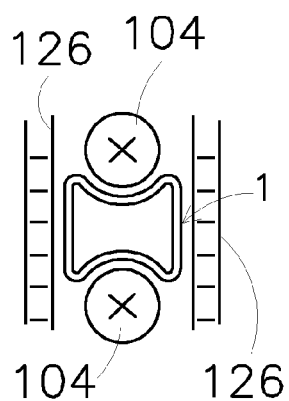
Figure 26F:
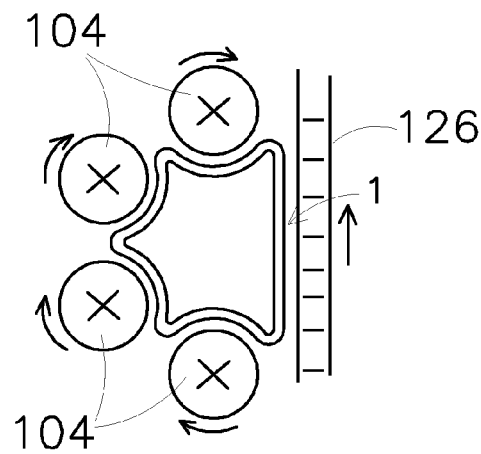

The rail 3 may be provided with a steep curve 123 (see FIG. 25) so that the gripper 10 is not moving for a short while above a drop or grab position 124 during constant movement of the transporter 41 through the curve from position 125a to 125b. The item can be grabbed or released with high precision at the drop or grab position 124 because there is no movement of the gripper 10 above the position 124.

The transfer apparatus may be constructed such that the item held by the gripper may be moveable by the gripper in a direction perpendicular to the main direction of the rail. The transfer apparatus may have an extendable arm which is extendable by the second profile cooperating with the second steering member of the gripper so as to extend the arm and move an item held by the gripper.

FIGS. 26a to 26f disclose different configurations in which the transferring apparatus 1 can be configured for grabbing and/or dropping items from and/or on rotary tables 104, optionally in combination with grabbing and dropping items from and/or on a linear transporter 126. An advantage of the transporting apparatus according to the invention is that the items are kept as an individual item in the transfer apparatus which makes it possible to individually check the items and/or to perform individual action on the items.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g. semiconductor memory, magnetic or optical disk) having such a computer program stored therein.

The invention further relates to a transfer apparatus, method or use as defined in any of the following clauses.

1. Transfer apparatus for transferring an item comprising;
   a rail forming an endless track along which the item is transferred,
   a transporter which is movable along the rail and comprises at least one gripper for gripping the item,
   a driver for moving the transporter along the rail, wherein the transporter comprises at least two carriers engaging the rail and located at a distance from each other,
   neighbouring carriers are coupled to each other by a coupler,
   at least one coupler is carrying at least one gripper,
   the rail comprises a first face and a second face,
   each carrier comprises a first engage member and a second engage member engaging the first face and a third engage member engaging the second face,
   the engage members of each carrier are positioned relative to each other such that said engage members form a triangle.

2. Transfer apparatus according to clause 1, wherein the rail comprises at least one inwards curved section which in use is to be positioned adjacent to a rotary table and the rail is constructed and arranged so that the gripper follows the rotary table.

3. Transfer apparatus according to any of clause 1 or 2, wherein the gripper is configured for gripping the item located outside an area enclosed by the track.

4. Transfer apparatus according to any of the clauses 1-3, wherein said engage members form an isosceles triangle.

5. Transfer apparatus according to any of the clauses 1-4, wherein the base of the triangle extends between the first and second engage members.

6. Transfer apparatus according to any of the clauses 1-5, wherein the first and second face are positioned at opposite sides of the rail.

7. Transfer apparatus according to any of the clauses 1-6, wherein the first and second engage members are located outside an area enclosed by the endless track and the third engage member is located inside said area.

8. Transfer apparatus according to any of the clauses 1-7, wherein the rail comprises a rail longitudinal axis and the engage members of the carrier are configured to engage the rail such that rotation of the carrier around the rail longitudinal axis is prevented.

9. Transfer apparatus according to any of the clauses 1-8, wherein each carrier comprises a carrier body which is connected to the first, second and third engage member and has a triangle-like form.

10. Transfer apparatus according to clause 9, wherein the form of the triangle-like carrier body corresponds to the triangle formed by the engage members.

11. Transfer apparatus according to any of the clauses 1-10, wherein each connection of the coupler to neighbouring carriers comprises a coupler axis about which the coupler is pivotable relative to the carrier comprising said connection.

12. Transfer apparatus according to clause 11, wherein the gripper is located in the middle between the two coupler axes of neighbouring carriers.

13. Transfer apparatus according to clause any of the clauses 1-12, wherein the carrier is configured to rotate about a carrier axis when being moved along curved sections of the rail.

14. Transfer apparatus according to clause 13 in combination with clause 11 or 12, wherein the carrier axis coincides with the coupler axis.

15. Transfer apparatus according to clause 11-14, wherein two neighbouring couplers are connected to the same carrier and share the same coupler axis.

16. Transfer apparatus according to any of the clauses 1-15, wherein the transporter is formed by an endless chain of coupled carriers.

17. Transfer apparatus according to clause 1-16, wherein the transporter extends along the entire rail.

18. Transfer apparatus according to any of the clauses 1-17, wherein
the transporter comprises at least one drive protrusion,
the driver comprises a screw-like surface winded around a screw axis and configured to move the transporter along the rail by engaging and pushing the drive protrusion when the screw-like surface is rotated around the screw axis.

19. Transfer apparatus according to clause 18, wherein
the driver comprises a cylindrical body comprising a cylinder housing and being rotatable around the cylinder longitudinal axis thereof, and
the screw-like surface is formed by a groove provided in the cylinder housing, said groove having a screw-like form winded around said cylinder longitudinal axis.

20. Transfer apparatus according to the clause 18 or 19, wherein the rail comprises a rail longitudinal axis and screw axis of the screw-like surface extends substantially parallel to said rail longitudinal axis.

21. Transfer apparatus according to any of the clauses 18-20, wherein the at least one drive protrusions are connected to the carriers.

22. Transfer apparatus according to any of the clauses 18-21, wherein each carrier comprises at least one drive protrusion.

23. Transfer apparatus according to any of the clauses 18-22, wherein in use the screw-like surface simultaneously engages multiple, preferably three, drive protrusions.

24. Transfer apparatus according to any of the clauses 18-23, wherein the driver comprises several screw-like surfaces positioned along the track and at a distance from each other.

25. Transfer apparatus according to any of the clauses 18-24, wherein the pitch of the screw-like surface is constant.

26. Transfer apparatus according to any of the clauses 18-25, wherein the driver is configured to rotate the screw-like surface in opposite directions around the screw axis.

27. Method of transferring an item with a transferring apparatus according to any of the clauses 1-26.

28. Use of a transferring apparatus according to any of the clauses 1-26.

29. Transfer apparatus 1 for transferring an item 100, the apparatus comprising:
a rail 3 forming a track 4;
a transporter 41 which is moveable along the rail;
a driver 7 for moving the transporter along the rail; and,
a gripper 10 for gripping the item and moveable by the transporter along the rail; wherein,
a gripper steering 50 is provided with a first profile 51 for cooperating with a first steering member 53 provided to the gripper for opening and closing the gripper so as to release or grab the item.

30. Transfer apparatus according to clause 29, wherein the track is an endless track comprising an inwards curved section which in use is to be positioned adjacent to a rotary table 104 and the rail is constructed and arranged so that the gripper follows the rotary table during grabbing or releasing the item.

31. Transfer apparatus according to clause 29 or 30, wherein the gripper steering is provided with a second profile 52 for cooperating with a second steering member 54 provided to the gripper.

32. Transfer apparatus according to clause 31, wherein the gripper is movable up and down by the second profile cooperating with the second steering member of the gripper.

33. Transfer apparatus according to clause 31, wherein the gripper is moveable up and down by the first and second profile cooperating with the first and second steering members of the grippers.

34. Transfer apparatus according to any of clauses 31 to 33, wherein the gripper comprises a pivoting axis 56 so as to pivot the gripper around the pivoting axis.

35. Transfer apparatus according to clause 34, wherein by pivoting the gripper an item held by the gripper is moveable up and down.

36. Transfer apparatus according to clause 34, wherein by pivoting the gripper an item held by the gripper is pivotable.

37. Transfer apparatus according to any of clauses 34 to 36, wherein the pivoting axis is parallel to a main direction of the first profile.

38. Transfer apparatus according to any of clauses 34 to 36, wherein the pivoting axis is perpendicular to a main direction of the first profile and the gripper can be tilted by slowing down one of the first and second steering members with respect to another of the first and second steering members.

39. Transfer apparatus according to any of clauses 31 to 35, wherein the item held by the gripper is moveable by the gripper in a direction perpendicular to a rail longitudinal axis 30 of the rail 3.

40. Transfer apparatus according to clause 29, wherein the first profile comprises a first profile adjustment member for adjusting the first profile.

41. Transfer apparatus according to clause 38, wherein the first profile adjustment member is moveable in direction parallel to the first profile.

42. Transfer apparatus according to clause 31, wherein the gripper comprises an extendable arm which is extendable by the second profile cooperating with the second steering member of the gripper so as to extend the arm and move an item held by the gripper.

43. Transfer apparatus according to any of the clauses 29-42, wherein the gripper comprises first and second gripper parts for grabbing an item in between the first and second gripper parts.

44. Transfer apparatus according to clause 38, wherein the first and second gripper parts are tiltable with respect to each other by the first steering member.

45. Transfer apparatus according to clause 38, wherein one of the first and second gripper parts is moveable with respect to another of the first and second gripper part.

46. Transfer apparatus according to clause 29, wherein the speed of the transporter can be adjusted with a speed adjustment driver 7 comprising a screw-like surface 24, 120 winded around a screw axis 25, 121 and configured to move the transporters 41, 42 along the rail by engaging and pushing a drive protrusions 23, 122.

47. Transfer apparatus according to clause 31, wherein the first and second steering members of the grippers are moveable with respect to each other so as to open up the gripper.

48. Method of transferring an item comprising:
moving a transporter along a track over a rail with a driver;
opening a gripper moveable by the transporter along the rail by a first profile of a gripper steering cooperating with a first steering member; wherein the method comprises,
grabbing the item by the gripper by
closing the gripper by the first profile of the rail cooperating with the first steering member.

The descriptions above are intended to be illustrative, not limiting. Thus, it will be apparent to one skilled in the art that modifications may be made to the invention as described without departing from the scope of the claims set out below.

The invention claimed is:

1. A transfer apparatus for transferring an item comprising;
a rail forming an endless track along which the item is transferred,
a transporter which is movable along the rail and comprises at least one gripper for gripping the item,
a driver for moving the transporter along the rail, wherein the transporter comprises at least two carriers engaging the rail and located at a distance from each other,
neighbouring carriers are coupled to each other by a coupler,
at least one coupler is carrying at least one gripper,
the rail comprises a first face and a second face,
each carrier comprises a first engage member and a second engage member engaging the first face and a third engage member engaging the second face, and
the engage members of each carrier are positioned relative to each other such that said engage members form a triangle.

2. The transfer apparatus according to claim 1, wherein the rail comprises at least one inwards curved section which in use is to be positioned adjacent to a rotary table and the rail is constructed and arranged so that the gripper follows the rotary table.

3. The transfer apparatus according to claim 1, wherein the gripper is configured for gripping the item located outside an area enclosed by the track.

4. The transfer apparatus according to claim 1, wherein said engage members form an isosceles triangle.

5. The transfer apparatus according to claim 1, wherein the base of the triangle extends between the first and second engage members.

6. The transfer apparatus according to claim 1, wherein the first and second face are positioned at opposite sides of the rail.

7. The transfer apparatus according to claim 1, wherein the first and second engage members are located outside an area enclosed by the endless track and the third engage member is located inside said area.

8. The transfer apparatus according to claim 1, wherein the rail comprises a rail longitudinal axis and the engage members of the carrier are configured to engage the rail such that rotation of the carrier around the rail longitudinal axis is prevented.

9. The transfer apparatus according to claim 1, wherein each carrier comprises a carrier body which is connected to the first, second and third engage member and has a triangle-like form.

10. The transfer apparatus according to claim 9, wherein the form of the triangle-like carrier body corresponds to the triangle formed by the engage members.

11. The transfer apparatus according to claim 1, wherein each connection of the coupler to neighbouring carriers comprises a coupler axis about which the coupler is pivotable relative to the carrier comprising said connection.

12. The transfer apparatus according to claim 11, wherein the gripper is located in the middle between the two coupler axes of neighbouring carriers.

13. The transfer apparatus according to claim 1, wherein the transporter comprises at least one drive protrusion,
the driver comprises a screw-like surface winded around a screw axis and configured to move the transporter along the rail by engaging and pushing the drive protrusion when the screw-like surface is rotated around the screw axis.

\* \* \* \* \*